United States Patent [19]

Bienert et al.

[11] 4,420,185
[45] Dec. 13, 1983

[54] DRIVE ARRANGEMENT FOR A MOTOR-VEHICLE TOP WITH OUTWARD-MOVING SLIDING COVER

[75] Inventors: Horst Bienert, Gauting; Hermann Pfisterer, Stockdorf, both of Fed. Rep. of Germany

[73] Assignee: Webasto-Werk W. Baier GmbH & Co., Munich, Fed. Rep. of Germany

[21] Appl. No.: 291,055

[22] Filed: Aug. 7, 1981

[30] Foreign Application Priority Data

Aug. 13, 1980 [DE] Fed. Rep. of Germany ....... 3030642

[51] Int. Cl.³ .................... G05D 3/00; H02P 1/04; H02P 3/00; B60J 7/02
[52] U.S. Cl. .................................... 296/223; 49/324; 318/468
[58] Field of Search ................ 98/2.14, 2.15; 49/224, 49/325; 318/215, 468; 296/223

[56] References Cited

U.S. PATENT DOCUMENTS

| 3,702,430 | 11/1972 | Knetsch | 318/468 |
|---|---|---|---|
| 4,039,222 | 8/1977 | Wolf et al. | 296/223 |
| 4,070,607 | 1/1977 | Mitterer | 318/468 |
| 4,073,536 | 2/1978 | Schatzler et al. | 296/223 |
| 4,272,125 | 6/1981 | Bienert et al. | 296/223 |

FOREIGN PATENT DOCUMENTS 7629034 3/1978 Fed. Rep. of Germany .

*Primary Examiner*—Richard A. Bertsch
*Attorney, Agent, or Firm*—Antonelli, Terry & Wands

[57] ABSTRACT

A drive arrangement for a motor vehicle top having an outwardly movable sliding cover driven by an electric motor through a transmission and at least one threaded cable engaging a pinion of the transmission, a manually-actuated switch and a limit switch with a contact arm being provided in a circuit of the electric motor, the contact arm cooperating with a cam of a trip gear to interrupt the current supply to the electric motor in a closed position of the sliding cover, is improved by a construction of the indexing gear transmission for changing the operation of the drive arrangement in a manner increasing the time available for actuation of the limit switch independently of the degree of mobility of the top and ambient temperature conditions when the top reaches a position near the fully closed position. This change in the operation of the drive arrangement is achieved by gear constructions which extend the length of an indexing step just prior to closure or by changing the motor operating speed and thereby reducing the angular velocity of a limit switch actuating trip gear.

11 Claims, 12 Drawing Figures

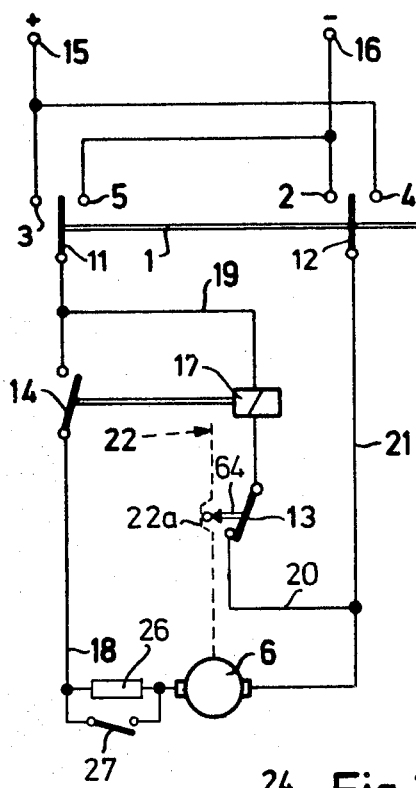
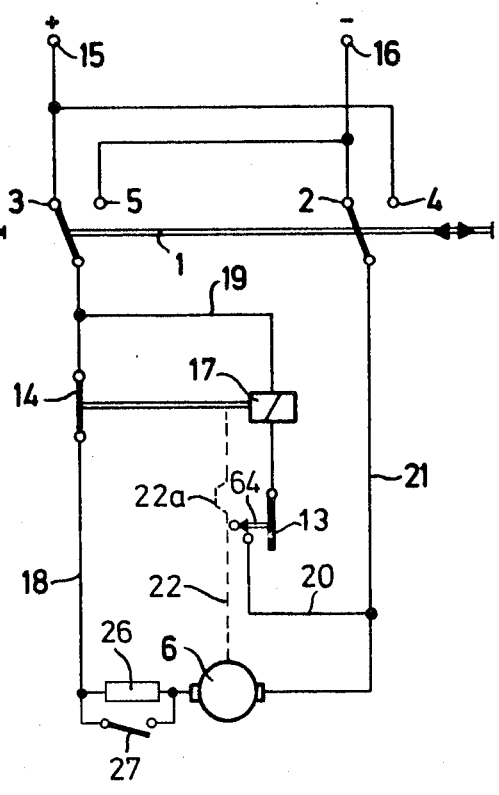
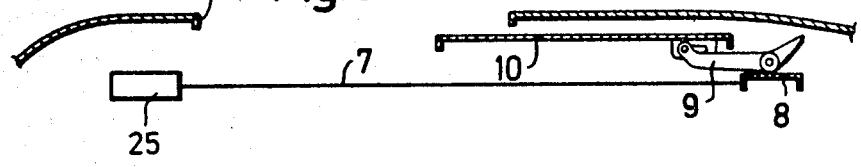
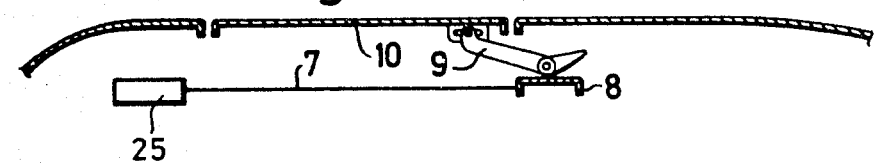
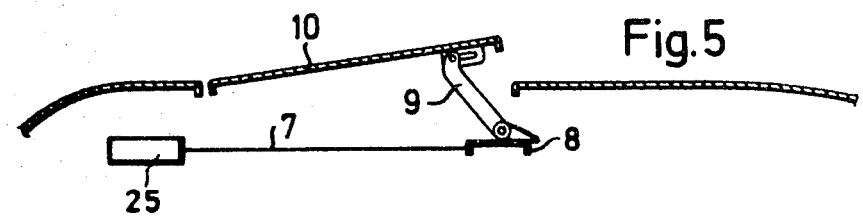

Fig.10
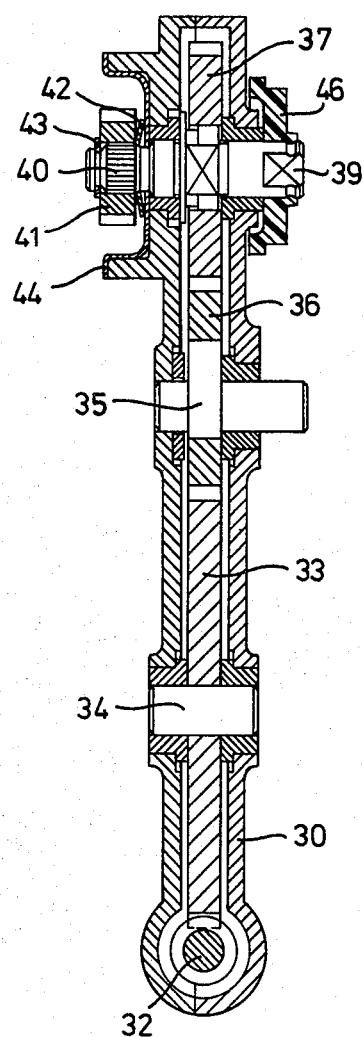
Fig.11
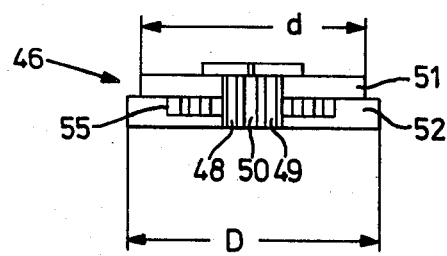
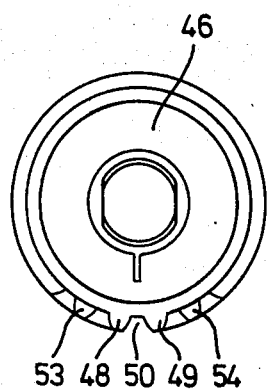
Fig.12

DRIVE ARRANGEMENT FOR A MOTOR-VEHICLE TOP WITH OUTWARD-MOVING SLIDING COVER

BACKGROUND AND SUMMARY OF THE INVENTION

The invention relates to a drive arrangement for a motor-vehicle top having an outward-moving sliding cover that is actuated by an electric motor, a transmission, and at least one threaded cable engaging a pinion of the transmission. The circuit of the electric motor comprises a manually-actuated switching means provided with a contact arm which, in the closed position of the sliding cover, cooperates with a cam of a trip gear to stop the electric-motor current supply. With an indexing gear driven by the pinion shaft, the toothed trip gear forms a step-by-step indexing transmission whose ratio is determined so that the trip gear rotates by a maximum angle of 360° while the sliding cover moves from its fully retracted position to the closed position and an upwardly fully extended position.

In a known drive arrangement of this type (German Gebrauchsmuster [Utility Model] No. 7,629,034), each revolution of the cam gear corresponds to a rotation of the indexing gear by a predetermined angle. Practice has shown that the known arrangement requires that the transmission elements be manufactured within narrow tolerance limits because, due to the high transmission ratio of the step-by-step indexing transmission, the length of the indexing step available to actuate the limit switch is very short. In addition, the response is determined by the mobility or inertia of the sliding cover and the ambient temperaure influencing the electric-motor rpm. Especially when the sliding cover is readily movable and the ambient temperature is relatively high, the limit switch may not be actuated in the closed position of the sliding cover, i.e. not respond in the closed position. Then the sliding cover undesirably moves beyond the closed position.

Basically, the electric motor can be slowed near the closed position by short circuit, polarity reversal, or actuation of magnetic brake. But such electromechanical structures are complicated, and therefore unsatisfactory.

Thus, a principal object of the invention is to provide a drive arrangement of the above-cited type which enables reliable actuation of the limit switch, therefore fundamentally eliminating switching errors, and therefore also creating a particularly simple, compact, and low-cost structure.

This object is achieved in accordance with a preferred embodiment of the invention by providing the step-by-step indexing transmission with transmission elements designed to extend the length of the indexing step of the trip gear near the closed position of the sliding cover, and/or to reduce the trip-gear angular velocity during said indexing step.

With this structure of the invention, the limit switch for interrupting the electric-motor current supply in the closed position of the sliding cover is given sufficient time for reliable operation, independently of the degree of mobility of the sliding cover and the ambient temperature. Satisfactory operation is assured even in the case of indexing gears of wider tolerance limits. Subsequent adjustment of the limit switch is unnecessary.

An especially simple structure appears in the embodiment of utilizing the trip gear of FIGS. 7, 8 in conjunction with the indexing gear of FIGS. 11 and 12. The indexing gear can be mounted directly on the pinion shaft. The load applied to the limit-switch contact arm is especially light when the cam cooperating therewith is in the form of a negative cam provided on the periphery of the trip gear.

In another development of the invention, the trip gear may also carry a cam surface to actuate an rpm-control switch connected to the electric motor and change the motor speed from a higher value used to effect the sliding motion of the sliding cover to a lower value during the portion of the sliding motion which immediately precedes the closed position and the outward-extension motion. Therefore, the time available to actuate the limit switch is increased, and also a sensitive control of the sliding-cover extension motion is provided.

In addition to producing a speed change during closing, a cam surface can be shaped so that the change over to a lower rpm can occur also in the last portion of the sliding motion, before the fully open position is reached. Thus, the sliding cover moves smoothly and surely to the end position.

These and other objects, features and advantages of the present invention will become more apparent from the following description when taken in connection with the accompanying drawing which shows, for purposes of illustration only, one embodiment in accordance with the present invention, and wherein:

BRIEF DESCRIPTION OF THE DRAWINGS

FIG. 1 is a basic circuit diagram of a drive arrangement in accordance with a preferred embodiment, the switch positions corresponding to the closed position of the sliding cover;

FIG. 2 is a basic circuit diagram as in FIG. 1, but in which the switch positions correspond to a retracted intermediate position of the sliding cover;

FIG. 3 is a schematic view of a motor-vehicle top with the sliding cover in the retracted position;

FIG. 4 represents the top of FIG. 3 with the sliding cover in the closed position;

FIG. 5 represents the top of FIG. 3 with the sliding cover in the outwardly extended position;

FIG. 10 is a section along line X—X in FIG. 6;

FIG. 11 is a side view of the cam gear;

FIG. 12 is a plan view of the cam gear of FIG. 11; and

DETAILED DESCRIPTION OF THE PREFERRED EMBODIMENT

Figure 6:
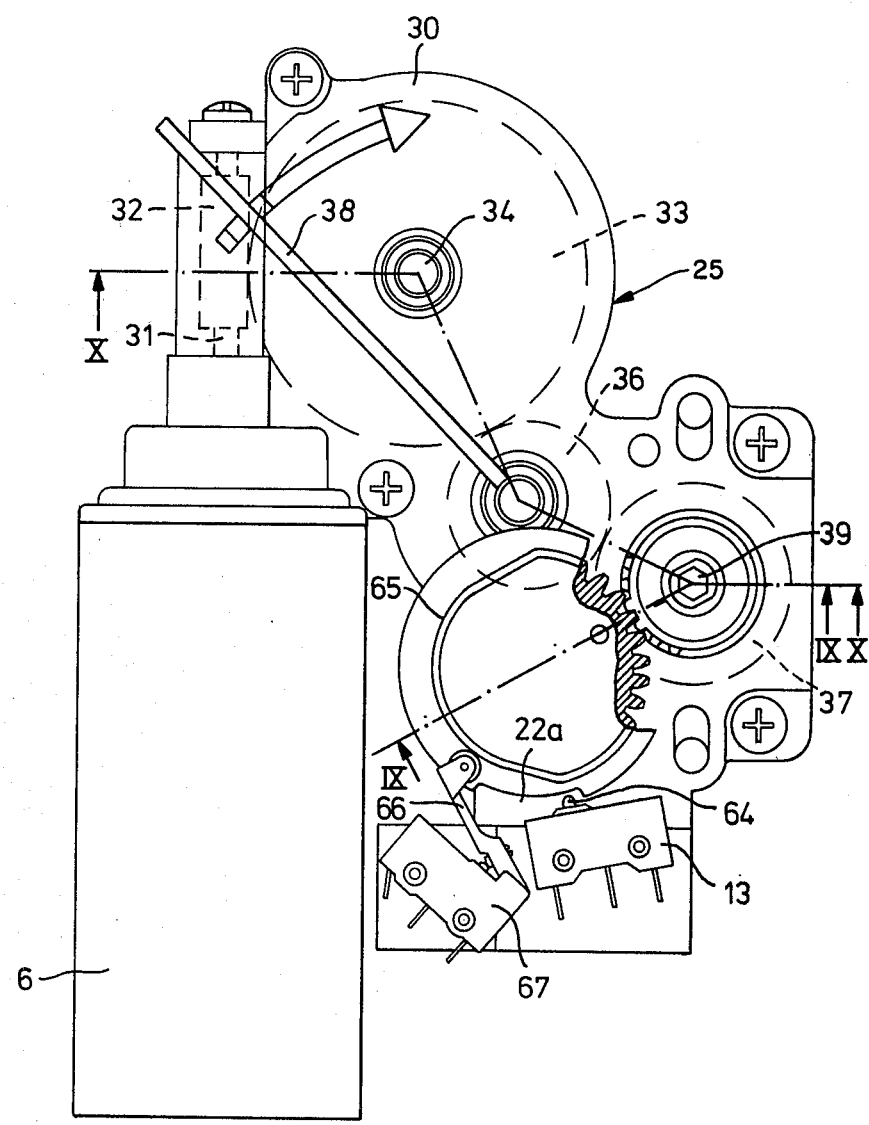
FIG. 6 is a plan view of the drive arrangement of the invention.

In the basic circuit of FIGS. 1 and 2 a reversing switch 1, that is automatically returned to the neutral position of FIG. 1 by a spring system (not shown), can be moved in one direction to contacts 2 and 3, and in an opposite direction to contacts 4 and 5. Contacts 3 and 4 are connected to the positive terminal 15, and contacts 2 and 5, to the negative terminal 16 of the vehicle battery. The contact arms 11 and 12 of reversing switch 1 are connected to the terminals of an electric motor 6 by two lines 18 and 21. Therefore, depending on the position of reversing switch 1, electric motor 6 can be operated in one or the other of forward and reverse directions. The sliding cover 10 represented in FIGS. 3–5 can be placed within or removed from an opening 24 in a top, such as a motor vehicle roof, by a transmission 25, at least one compression-resistant cable 7, a drive yoke 8, and a lever 9. First line 18 comprises a switch 14 actuated by an impulse relay 17. The control winding of relay 17 is connected to first line 18 between switch 14 and contact arm 11 by a first junction line 19, and to line 21 by a second junction line 20. Line 20 contains a limit switch 13 actuated by a trip gear schematically represented at 22. Trip gear 22 is driven by motor 6 and is provided with a negative cam 22a which, in the closed position of sliding cover 10, cooperates with limit switch 13 to establish a connection between impulse relay 17 and line 21 (FIG. 1).

A resistor 26 mounted ahead of motor 6 can be by-passed with a switch 27. Resistor 26 reduces the rpm of motor 6 when switch 27 is open.

When reversing switch 1 is moved onto contacts 2 and 3 (FIG. 2) impulse relay 17 is supplied current over limit switch 13 which is still in the position of FIG. 1, switch 14 closes, and electric motor 6 is connected to terminals 15 and 16. Motor 6 drives cable 7 through transmission 25. Sliding cover 10 is moved back from the closed position of FIG. 4 to the open position of FIG. 3. Trip gear 22 moves simultaneously, so that limit switch 13 opens. If reversing switch 1 is still actuated, sliding cover 10 is pulled back to its end position. When the sliding cover is to be closed again, reversing switch 1 is reversed. The direction of rotation of motor 6 reverses. In the closed position of cover 10, negative cam 22a moves the contact arm of limit switch 13 to the position of FIG. 1. Impulse relay 17 is energized and opens switch 14, and the current supply to motor 6 is discontinued. When the reversing switch is moved to contacts 4 and 5, impulse relay 17 responds again. Switch 14 closes. Motor 6 is driven in the direction of rotation for which sliding cover 10 is extended outward as in FIG. 5. Trip gear 22 rotates. Switch 13 opens.

Figure 9:
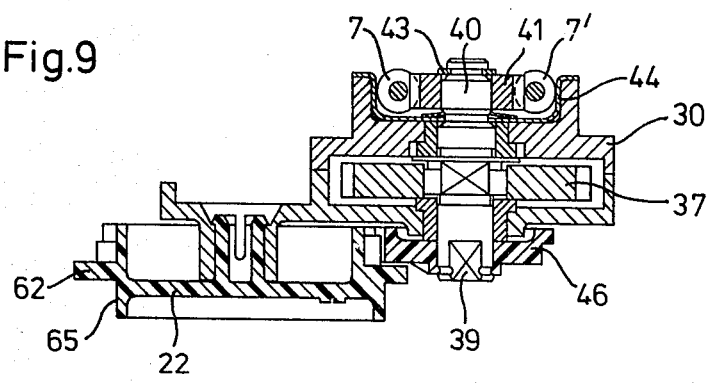
FIG. 9 is a section along line IX—IX in FIG. 6.

As shown especially in FIGS. 6, 9 and 10, transmission 25 comprises a housing 30 to which electric motor 6 is united by a flanged joint. The shaft 31 of the motor, which extends into housing 30, carries a worm 32 meshing with a worm gear 33 that is arranged on a shaft 34 which is mounted for free rotation in housing 30. An intermediate gear 36 is freely rotatable on an eccentric shaft 35 also mounted in housing 30. In the position represented in FIG. 6 intermediate gear 36 constitutes a drive connection between worm gear 33 and an output gear 37. Eccentric shaft 35 can be oscillated manually by a decoupling lever 38 (FIG. 6) to disconnect output gear 37 from worm gear 33 and electric motor 6. Thus, in the occurrence of a breakdown, motor 6 can be disconnected, and when necessary sliding cover 10 can be moved by a hand crank (not shown) which can be introduced into an opening 39 of hexagonal shape in an output shaft 40 rigidly connected to output gear 37. Output shaft 40 carries a drive pinion 41 that is fixed between a spring washer 42 and a lockwasher 43. Spring washer 42 is in contact with a cable guide 44 which holds two compression-resistant cables 7 and 7' that are attached to drive yoke 8 and meshed with drive pinion 41 (FIG. 9). On the side opposite drive pinion 41, an indexing gear 46 is rigidly fixed to output shaft 40 to form a step-by-step indexing transmission with trip gear 22 which is freely rotatable in housing 30.

As shown in particular in FIGS. 11 and 12, the peripheral surface of indexing gear 46 exhibits a gap 50 between two long teeth 48 and 49. Along a portion 51 of its axial extension indexing gear 46 is reduced to a smaller diameter (d) which corresponds substantially to the base circle of gap 50. In the region of the portion 52 of larger diameter (D), near each of the two long teeth 48 and 49, indexing gear 46 is provided with a short tooth 53 or 54 extending over a portion 55 of the axial extension of the portion 52 of larger diameter (D).

Figure 7:
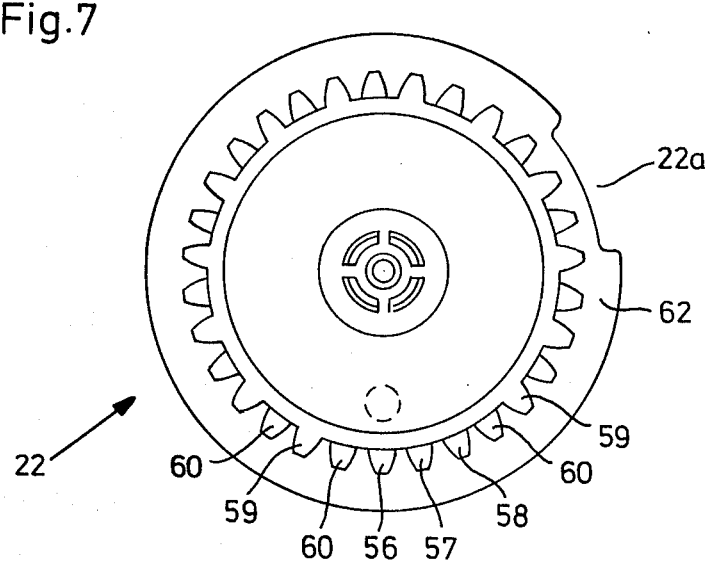
FIG. 7 is a view on a larger scale of the indexing gear, observed from the bottom of FIG. 6.
Figure 8:
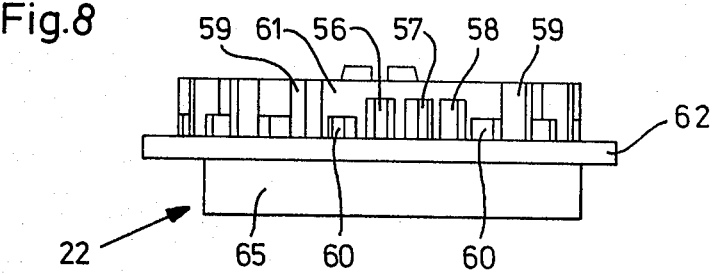
FIG. 8 is a side view of the indexing gear of FIG. 7.

As shown in FIGS. 7 and 8, trip gear 22 (which is shown engaging indexing gear 46 in FIG. 9) carries, in the region determining the indexing step corresponding to the closed position of sliding cover 10, three medium-length teeth 56, 57, and 58 which mesh with both the long teeth 48 and 49 and the short teeth 53 and 54 of indexing gear 46. In the regions of trip gear 22 determining the sliding and the outward-extension indexing steps, alternately long and short teeth 59 and 60 are provided, and one short tooth 60 follows the three medium-length teeth 56, 57 and 58 along the periphery of trip gear 22. The axial dimension of short teeth 60 corresponds to the height of the reduced portion 51 of indexing gear 46. The portion of trip gear 22 carrying teeth 56–60 is followed in the axial direction by a collar 62 which extends radially beyond the teeth and is provided with negative cam 22a.

The head of limit switch 13, represented as contact arm 64 in FIGS. 1 and 2, is in contact with collar 62. Switch 13 is normally held open as in FIG. 2. Switch 13 is moved to the closed position of FIG. 1 when contact arm 64 is opposite negative cam 22a.

On the side of collar 62 axially opposite portion 61, trip gear 22 is provided with a cam surface 65 to actuate the arm 66 of a switch 67 constituting switch contact 27. Cam surface 65 is shaped so that, during the part of the sliding motion immediately preceding the closed position of the cover, during the last part of the sliding motion preceding the fully open position, and during the outward extension of sliding cover 10, switch contact 27 can be moved to its open position whereby resistor 26 reduces the rpm of the motor to move the sliding cover at a lower speed.

If, for example, sliding cover 10 is in the open position as in FIG. 3 and, on actuation of reversing switch 1, electric motor 6 is started in the direction which corresponds to the closing of sliding cover 10, indexing gear 46 is driven continuously clockwise, as in FIG. 6, by worm 32, work gear 33, intermediate gear 36, and output gear 37. When, during a revolution of indexing gear 46, gap 50 is engaged by one of the long teeth 59 of trip gear 22, the gear 2 is induced to perform an indexing step corresponding, for example, to an angle of rotation of 24° of gear 22.

Figure 13:
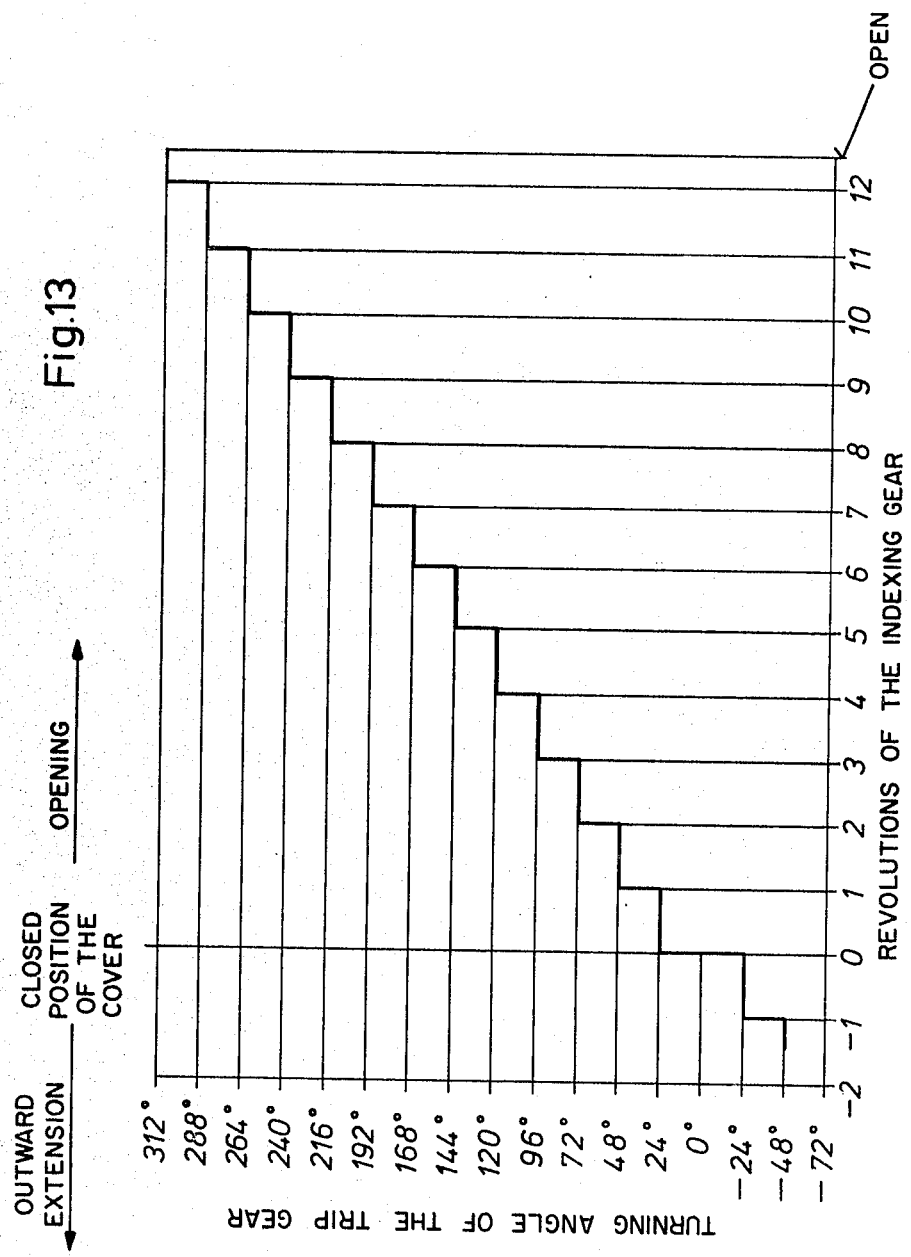
FIG. 13 is a diagram representing the indexing steps of the trip gear in dependence of the indexing-gear rotation.

As in the graphical illustration of FIG. 13, for each revolution of indexing gear 46, trip gear 22 moves by one indexing step until, in the angular position of said gear 22 corresponding to the closed position of sliding cover 10, the long teeth 48 and 49 which define gap 50 and the short teeth 53 and 55 of indexing gear 46 engage the medium-length teeth 56–58 of trip gear 22. Consequently, for the revolution concerned of indexing gear 46, trip gear 22 is induced to move by a step which is twice the length of a normal indexing step and amounts to 48° in the present embodiment.

Therefore, negative cam 22a can be relatively wide and limit switch 13 responds reliably in the closed position of sliding cover 10, even when the cover moves at a relatively rapid rate, for example, due to high temperatures and the relatively high mobility of the cover. If, subsequently, sliding cover 10 is extended outward (FIG. 5 and left-hand portion of the diagram of FIG. 13), a normal indexing step of, for example 24° of trip gear 22 corresponds again to a revolution of indexing gear 46 during the outward-extension motion.

Several procedures can be used to stop motor 6 in the open position of FIG. 3 or in the outwardly-extended position of FIG. 5. For example, a current detector can be used to sense an increase in the motor current when sliding cover 10 reaches end positions predetermined by mechanical stops, and to interrupt the current supply to motor 6. In some cases a friction clutch can be used between the motor and drive pinion 41. Motor 6 can also be stopped in the end positions of the cover by actuation of limit switch 13 with additional cams provided on trip gear 22. In the latter case the indexing step can be lengthened in the cover end position ranges by the use on trip gear 22 of additional medium-length teeth similar to teeth 56–58.

Although a series resistor 26 is used to change the rpm in the basic circuit diagrams of FIGS. 1 and 2, a pole-changing electric motor, for example, may be used, the pole changing being determined by a switch similar to switch contact 27.

The invention is not limited to the use of an impulse relay 17 as in FIGS. 1 and 2. It is possible, for example, to mount limit switch 13 directly in the motor circuit and provide a manually-actuated switch to selectively bypass the open limit switch.

It should be appreciated that, while the disclosed, most preferred, embodiment utilizes a trip gear 22 and indexing gear 46 in a manner so as to both increase the length of the indexing step occurring when the sliding cover 10 approaches its closed position as well as to effectuate a drive speed reduction, it is contemplated that either one of these changes in the operation of the drive arrangement may be used alone with a lesser, but still improved, limit switch actuation reliability.

While we have shown and described several embodiments in accordance with the present invention, it is understood that the same is not limited thereto but is susceptible of numerous changes and modifications as known to those skilled in the art, and we, therefore, do not wish to be limited to the details shown and described herein but intend to cover all such changes and modifications as are encompassed by the scope of the appended claims.

We claim:

1. A drive arrangement for a motor-vehicle top having an outwardly movable sliding cover driven by an electric motor through a transmission and at least one threaded cable engaging a pinion of the transmission, a manually-actuated switch and a limit switch with a contact arm being provided in a circuit of the electric motor, said contact arm cooperating with a cam of a trip gear to interrupt the current supply to the electric motor in a closed position of the sliding cover, and teeth of said trip gear forming with an indexing gear driven by the pinion shaft a step-by-step indexing transmission whose transmission ratio is determined so that the trip gear rotates by a maximum angle of 360° as the sliding cover moves from a fully retracted position to the closed position and an upwardly fully extended position; characterized in that the step-by-step indexing transmission is provided with transmission elements for performing at least one of extending the length of an indexing step conducted near the closed position of the sliding cover and reducing the angular velocity of the trip gear during said indexing step.

2. The drive arrangement as in claim 1, characterized in that a peripheral surface of the indexing gear is provided with a gap defined by two long teeth, a portion of the axial extension of said indexing gear being reduced to a smaller diameter corresponding substantially to a circle at the base of the gap, and a portion of the indexing gear of larger diameter ajacent to each of the two adjacent teeth being provided with at least one short tooth extending over a portion of the axial extension of larger diameter; and in that, as a differential gear, the trip gear carries a series of three or more teeth capable of engaging the two long teeth and the at least one short tooth of the indexing gear in a region determining the indexing step corresponding to the closed position of the sliding cover, alternately long and short teeth being provided in the region of the trip gear for determining the indexing steps for sliding and outward-extension motions, and the axial dimension of the short teeth corresponding to the height of the reduced portion of the indexing gear.

3. The drive arrangement as in claim 1 or 2, characterized in that the indexing gear is mounted on the pinion shaft.

4. The drive arrangement as in claim 3, characterized in that the trip gear also carries a cam surface to actuate an rpm-changing switch connected to the electric motor, said switch being operable to reduce the rpm of the electric motor from a higher value, utilized to slide the sliding cover from the fully retracted position to a position immediately preceding the cover closed position, to a lower value during the portion of the sliding motion immediately preceding the cover closed position and during outward-extension motion.

5. The drive arrangement as in claim 4, characterized in that the cam surface is shaped so that the rpm of the motor is reduced to the lower value also in the last portion of the sliding motion, before the cover has reached the fully open position.

6. The drive arrangement as in claim 1 or 2, characterized in that the cam cooperating with the contact arm of the limit switch is in the form of a negative cam provided on the periphery of the trip gear.

7. The drive arrangement as in claim 1 or 2, characterized in that the trip gear also carries a cam surface to actuate an rpm-changing switch connected to the electric motor, said switch being operable to reduce the rpm of the electric motor from a higher value, utilized to slide the sliding cover from the fully retracted position to a position immediately preceding the cover closed position, to a lower value during the portion of the sliding motion immediately preceding the cover closed position and during outward-extension motion.

8. The drive arrangement as in claim 7, characterized in that the cam surface is shaped so that the rpm of the motor is reduced to the lower value also in the last portion of the sliding motion, before the cover has reached the fully open position.

9. In a drive arrangement for a closure panel of a motor vehicle of the type having an electric motor that is operable to displace the closure panel through the intermediary of an indexing gear transmission and at least one threaded cable that engages a pinion of the transmission, and a limit switch actuated motor control for stopping said closure panel in a fully closed position situated between a pair of end positions of a path of movement of said closure panel, the improvement comprising means for improving actuation of said limit switch control, said means for improving including gear means, forming part of said indexing gear transmission, for changing the operation of the drive arrangement in a manner increasing the time available for actuation of said limit switch control independently of the degree of mobility of the closure panel and ambient temperature when said closure panel reaches a position near said fully closed position.

10. A drive arrangement according to claim 9, wherein said gear means comprises elements arranged for extending the length of an indexing step.

11. A drive arrangement according to claim 9 or 10, wherein said gear means comprises elements arranged for reducing the angular velocity of a limit switch actuating trip gear.

* * * * *